United States Patent
Kim et al.

(10) Patent No.: US 10,694,415 B2
(45) Date of Patent: Jun. 23, 2020

(54) APERIODIC CSI REPORTING METHOD BASED ON APERIODIC CSI-RS IN WIRELESS COMMUNICATION SYSTEM, AND DEVICE THEREFOR

(71) Applicant: LG ELECTRONICS INC., Seoul (KR)

(72) Inventors: Hyungtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/306,516

(22) PCT Filed: Jun. 26, 2017

(86) PCT No.: PCT/KR2017/006701
§ 371 (c)(1),
(2) Date: Nov. 30, 2018

(87) PCT Pub. No.: WO2017/222353
PCT Pub. Date: Dec. 28, 2017

(65) Prior Publication Data
US 2019/0124539 A1 Apr. 25, 2019

Related U.S. Application Data

(60) Provisional application No. 62/354,122, filed on Jun. 24, 2016, provisional application No. 62/373,971, (Continued)

(51) Int. Cl.
*H04W 24/10* (2009.01)
*H04W 72/14* (2009.01)
(Continued)

(52) U.S. Cl.
CPC .......... *H04W 24/10* (2013.01); *H04B 7/0626* (2013.01); *H04L 1/0026* (2013.01); (Continued)

(58) Field of Classification Search
CPC ... H04W 72/14; H04B 7/0626; H04B 7/0417; H04B 7/06; H04B 7/0617; H04L 5/0057; H04L 1/0026
See application file for complete search history.

(56) References Cited

U.S. PATENT DOCUMENTS

2012/0202477 A1* 8/2012 Eriksson ............ H04L 1/0021
455/419
2013/0195045 A1 8/2013 Papasakellariou et al.
(Continued)

FOREIGN PATENT DOCUMENTS

KR 101595167 2/2016
KR 1020160041932 4/2016
(Continued)

OTHER PUBLICATIONS

PCT International Application No. PCT/KR2017/006701, Written Opinion of the International Searching Authority dated Sep. 28, 2017, 21 pages.

*Primary Examiner* — Jamal Javaid
(74) *Attorney, Agent, or Firm* — Lee Hong Degerman Kang Waimey

(57) ABSTRACT

Disclosed in the present application is a method by which a terminal reports aperiodic channel status information (CSI) to a base station in a wireless communication system. Particularly, the method comprises the steps of: receiving, from the base station, through downlink control information (DCI), a CSI report triggering message including information on at least one CSI process among a plurality of CSI processes and on one aperiodic reference signal among a plurality of aperiodic reference signal resources included in
(Continued)

the at least one CSI process; and updating the aperiodic CSI relating to the at least one CSI process and reporting the same to the base station, on the basis of the one aperiodic reference signal.

8 Claims, 8 Drawing Sheets

Related U.S. Application Data filed on Aug. 11, 2016, provisional application No. 62/376,414, filed on Aug. 18, 2016, provisional application No. 62/456,606, filed on Feb. 8, 2017.

(51) Int. Cl.
*H04L 5/00* (2006.01)
*H04B 7/06* (2006.01)
*H04L 1/00* (2006.01)

(52) U.S. Cl.
CPC .............. *H04L 5/00* (2013.01); *H04L 5/0057* (2013.01); *H04W 72/14* (2013.01)

(56) References Cited

U.S. PATENT DOCUMENTS

2015/0295694 A1* 10/2015 Li .................... H04L 1/0026
370/329
2016/0227519 A1* 8/2016 Nimbalker ............ H04L 5/0094

FOREIGN PATENT DOCUMENTS

WO 2015160198 10/2015
WO 2015168925 11/2015

* cited by examiner (A) CONTROL-PLANE PROTOCOL STACK (B) USER-PLANE PROTOCOL STACK

APERIODIC CSI REPORTING METHOD BASED ON APERIODIC CSI-RS IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/006701, filed on Jun. 26, 2017, which claims the benefit of U.S. Provisional Application No. 62/354,122, filed on Jun. 24, 2016, 62/373,971, filed on Aug. 11, 2016, 62/376,414, filed on Aug. 18, 2016, and 62/456,606, filed on Feb. 8, 2017, the contents of which are all hereby incorporated by reference herein in their entirety.

TECHNICAL FIELD

The present disclosure relates to a wireless communication system, and more particularly, to a method for reporting an aperiodic CSI (Channel Status Information) based on an aperiodic CSI-RS (Channel Status Information-Reference Signal) in a wireless communication system and to a device for performing the method.

BACKGROUND

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Purpose

Based on the above discussion, the present disclosure proposes a method for reporting aperiodic CSI based on aperiodic CSI-RS in a wireless communication system and a device for such a method.

Technical Solution

In one aspect of the present disclosure, there is provided a method for reporting, by a user equipment (UE), aperiodic channel status information (CSI) to a base station in a wireless communication system, the method comprising: receiving, from the base station, a CSI report-triggering message via downlink control information (DCI), wherein the CSI report-triggering message include information about at least one CSI process among a plurality of CSI processes, and about an aperiodic reference signal among a plurality of aperiodic reference signal resources included in the at least one CSI process; and updating the aperiodic CSI for the at least one CSI process based on the single aperiodic reference signal and reporting the updated aperiodic CSI to the base station.

In another aspect of the present disclosure, there is provide a user equipment (UE) in a wireless communication system, the UE comprising: a wireless communication module; and a processor coupled to the module, wherein the processor is configured for: receiving, from a base station, a CSI report-triggering message via downlink control information (DCI), wherein the CSI report-triggering message include information about at least one CSI process among a plurality of CSI processes, and about an aperiodic reference signal among a plurality of aperiodic reference signal resources included in the at least one CSI process; and updating the aperiodic CSI for the at least one CSI process based on the single aperiodic reference signal and reporting the updated aperiodic CSI to the base station.

In one embodiment, the processor is further configured for reporting, to the base station, user equipment capability information including a threshold value of CSI computing capability of the UE, wherein when a number of CSI reports to be updated for a predetermined time unit exceeds the threshold value, the processor is further configured for updating only a number of CSI reports corresponding to a number smaller than or equal to the threshold value. In one embodiment, when the number of CSI reports to be updated for the predetermined time unit exceeds the threshold value, the processor is configured for setting, to any value, a report value for a number of CSI reports corresponding to a number by which the exceeding number exceeds the threshold value. In one embodiment, the processor is configured for first selecting, among a number of CSI reports corresponding to a number smaller than or equal to the threshold value, a CSI report corresponding to a lowest CSI process index.

In one embodiment, the processor is configured for receiving information about the plurality of CSI processes including the plurality of aperiodic reference signal resources via an upper layer from the base station.

In one embodiment, the DCI include an uplink grant.

Technical Effect

According to an embodiment of the present disclosure, the user equipment can more efficiently report the aperiodic CSI based on the aperiodic CSI-RS in a wireless communication system.

It will be appreciated by persons skilled in the art that that the effects that can be achieved through the present invention are not limited to what has been particularly described hereinabove and other advantages of the present invention will be more clearly understood from the following detailed description.

DETAILED DESCRIPTIONS

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
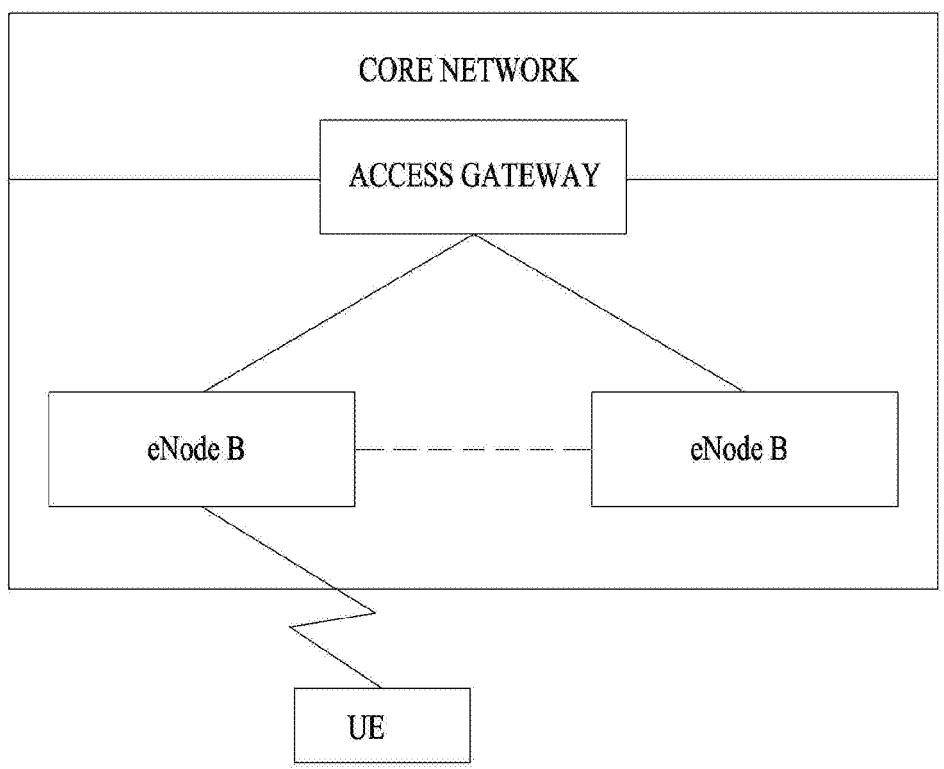
FIG. 1 illustrates a configuration of an Evolved Universal Mobile Telecommunications System (E-UMTS) network as an example of a wireless communication system.
Figure 2:
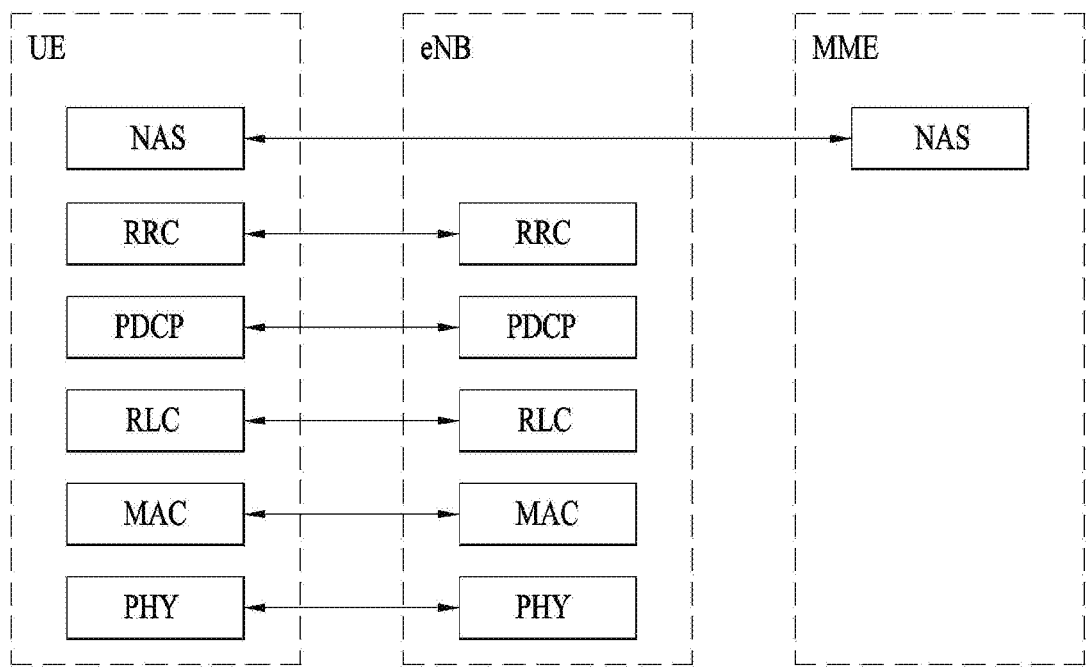
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).
Figure 2:
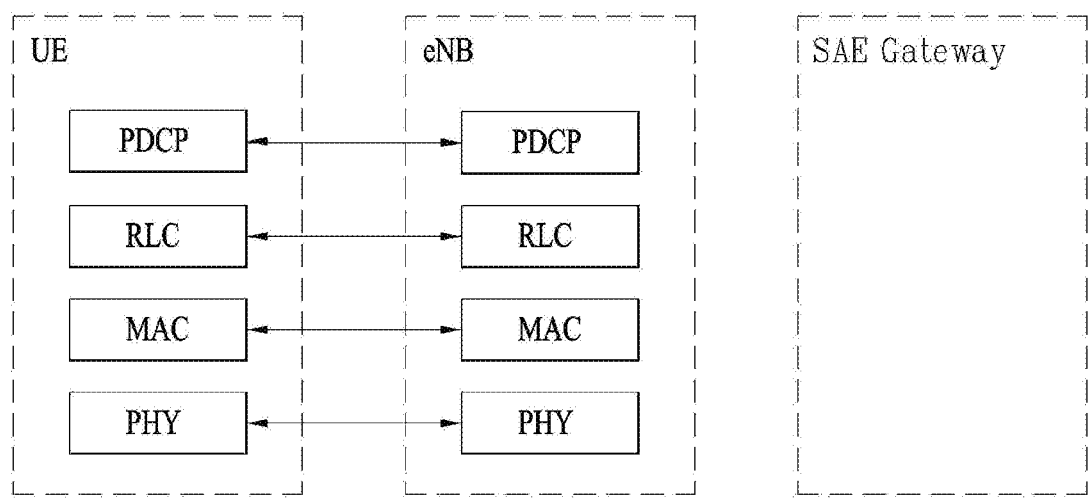

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
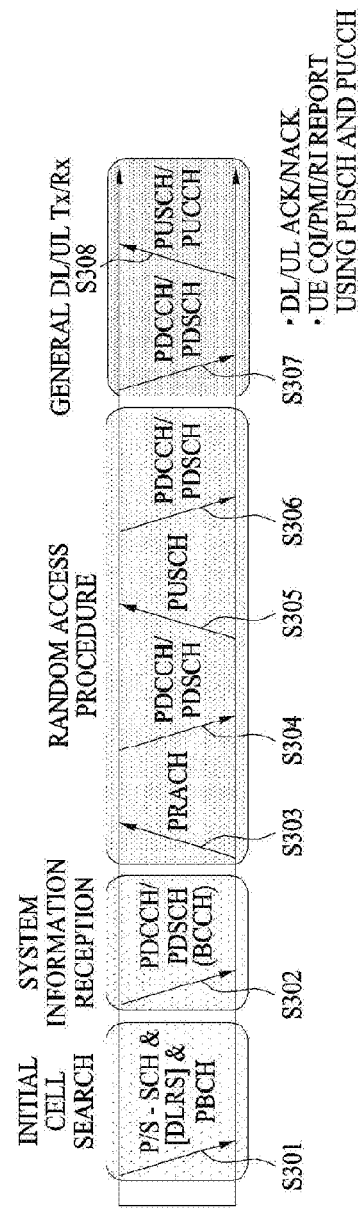
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
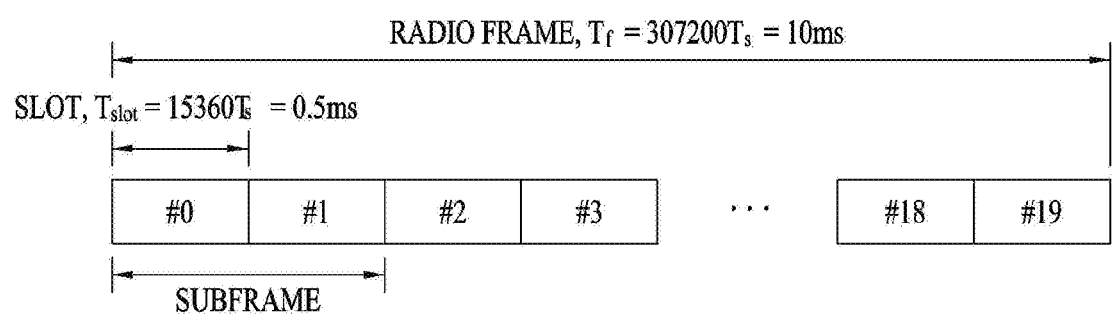
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
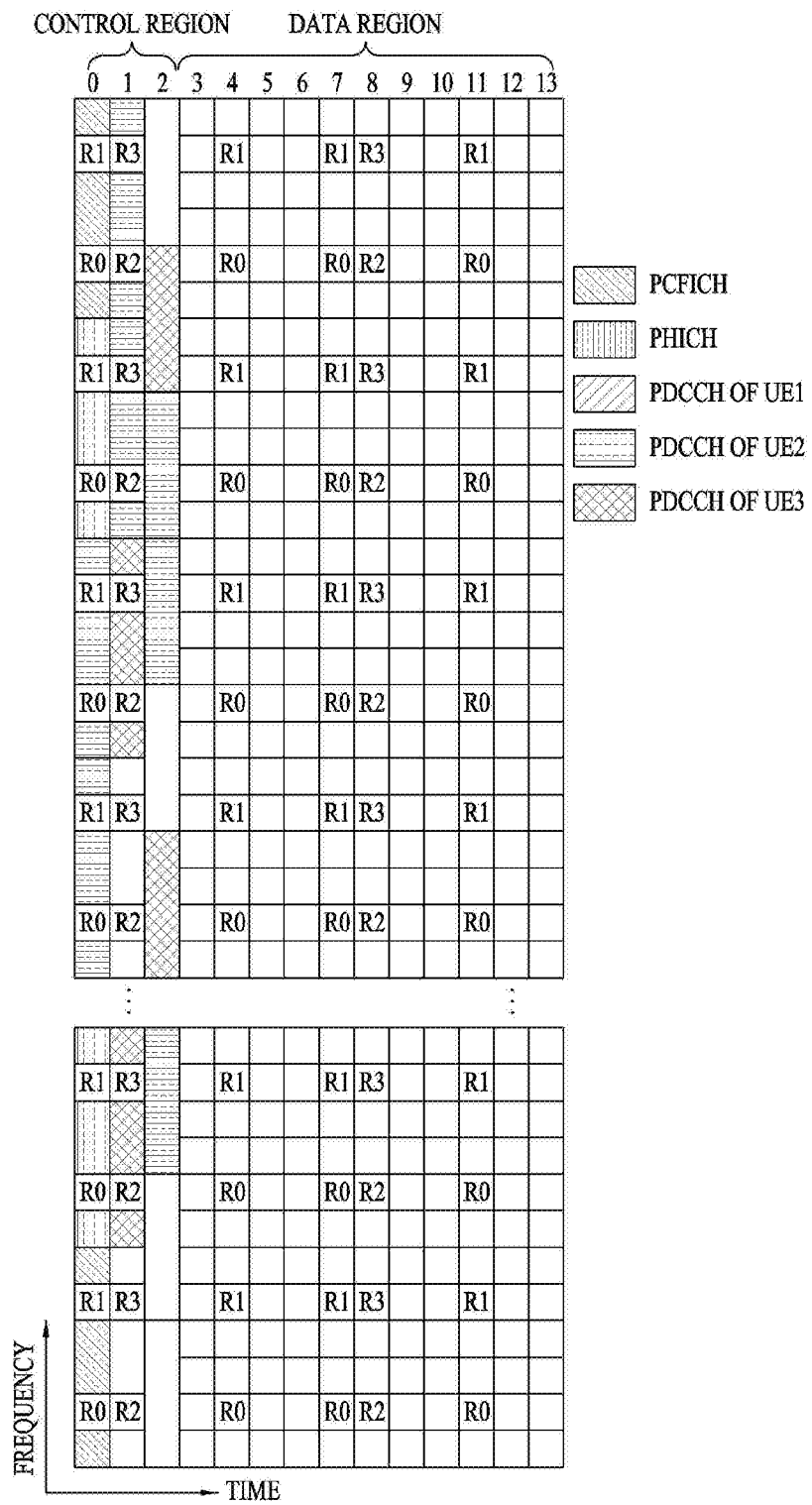
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
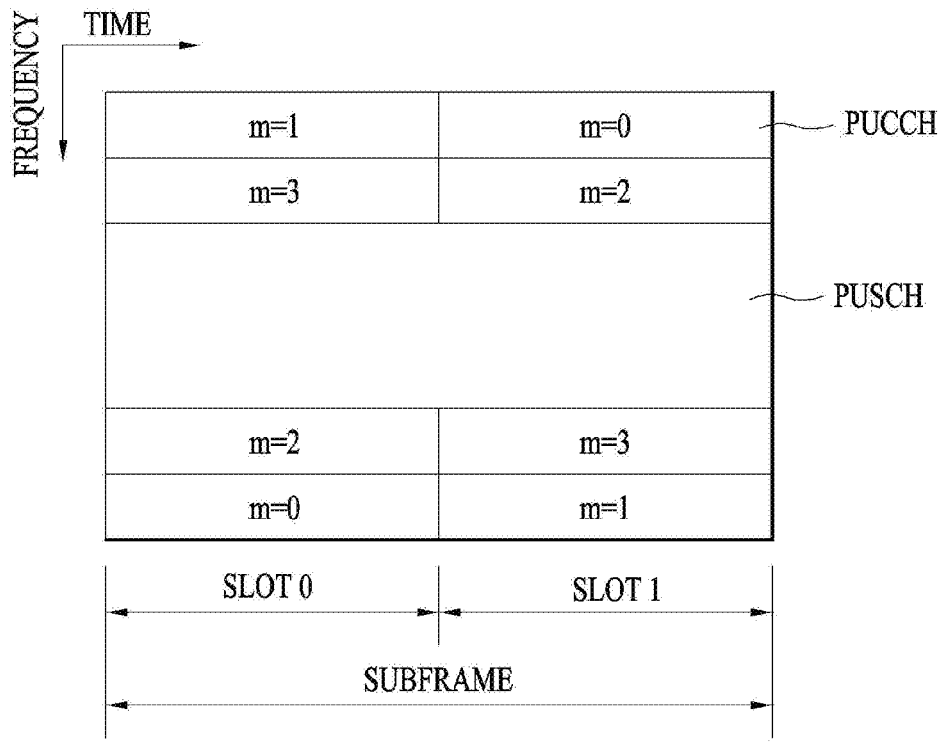
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
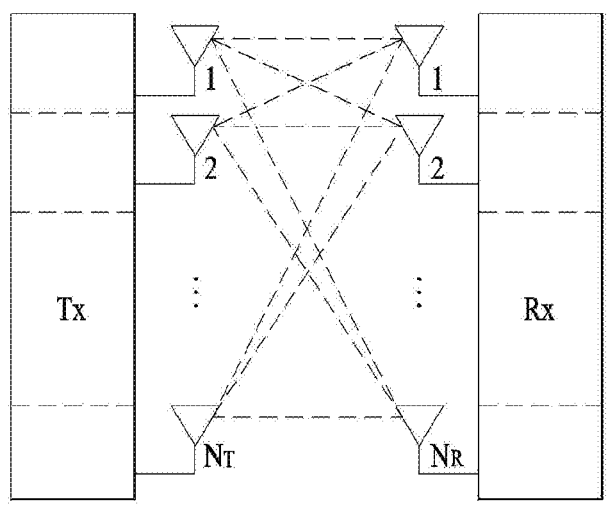
FIG. 7 is a schematic diagram of a typical multi-antenna (MIMO) communication system.

The configuration of a general MIMO communication system is shown in FIG. 7.

A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$s = [s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ to be actually transmitted may be configured by multiplying the transmission power-controlled information vector $\hat{s}$ by a weight matrix w. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Hereinafter, the reference signal will be described in more detail.

In general, for the channel measurement, a reference signal already known to both the transmitting side and the receiving side is transmitted from the transmitting side to the receiving side together with the data. This reference signal informs the modulation technique as well as the channel measurement, thereby to allow performing the demodulation process. The reference signal is divided into a dedicated reference signal (DRS) to the base station and a specific user equipment, that is, a user equipment-specific reference signal, and a common reference signal (common RS or Cell-specific RS; CRS), which is a cell-specific reference signal for all user equipments in the specific cell. Further, the cell-specific reference signal includes a reference signal by which the UE measures CQI/PMI/RI and reports measurements to the base station. This reference signal may be referred to as CSI-RS (Channel State Information-RS).

The above-mentioned CSI-RS has been proposed for channel measurement for PDSCH separately from the CRS. Unlike the CRS, the CSI-RS may be defined using up to 32 different resource configurations to reduce inter-cell interference (ICI) in a multi-cell environment.

The CSI-RS (resource) configurations differ according to the number of antenna ports. The CSI-RS defined using a maximum number of different resource configurations is transmitted between adjacent cells. Unlike CRS, CSI-RS supports up to 8 antenna ports. In the 3GPP standards document, a total of eight antenna ports from antenna ports #15 to #22 are assigned to antenna ports for CSI-RS. Following Tables 1 and 2 show the CSI-RS configuration defined in the 3GPP standards document. Particularly, Table 1 relates to the case of Normal CP, while Table 2 shows the case of Extended CP.

TABLE 1

| CSI reference signal config- uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

| CSI reference signal config- uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |

TABLE 2-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 12 | (7, 4) | 1 | | | | |
| 13 | (6, 4) | 1 | | | | |
| 14 | (1, 4) | 1 | | | | |
| 15 | (0, 4) | 1 | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

(Rows 16–27 apply to Frame structure type 2 only)

In the above Table 1 and Table 2, (k',l') represents a RE index, k' represents a subcarrier index, l' represents a OFDM symbol index. FIG. 11 illustrates the CSI-RS configuration #0 in the case of the normal CP among the CSI-RS configurations defined in the current 3GPP standard document.

Further, a CSI-RS subframe configuration may be defined. The CSI-RS subframe configuration may be composed of a periodicity ($T_{CSI-RS}$) and a subframe offset ($\Delta_{CSI-RS}$) expressed in a subframe unit. Table 3 below shows the CSI-RS subframe configuration defined in the 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Currently, the information about the ZP (zero-power) CSI-RS is included in a form shown in Table 4 below into the CSI-RS-Config-r10 message and is transmitted via the RRC layer signal. In particular, the ZP CSI-RS resource configuration may be composed of zeroTxPowerSubframe-Config-r10 and zeroTxPowerResourceConfigList-r10, which is a 16-bit sized bitmap. Among them, the zeroTx-PowerSubframeConfig-r10 informs, via a corresponding $I_{CSI-RS}$ value in Table 3, the periodicity and the subframe offset at which the corresponding ZP CSI-RS is transmitted. Further, the zeroTxPowerResourceConfigList-r10 may be information that informs the ZP CSI-RS configuration. Each element of the bitmap indicates configurations included in a column corresponding to four antenna ports for the CSI-RS in the above Table 1 or Table 2. That is, according to the 3GPP standard document, the ZP CSI-RS is defined only when there are four antenna ports for the CSI-RS.

TABLE 4

```
-- ASN1START
CSI-RS-Config-r10 ::=          SEQUENCE {
    csi-RS-r10                 CHOICE {
        ...
    }
    zeroTxPowerCSI-RS-r10      CHOICE {
        release                NULL,
        setup                  SEQUENCE {
            zeroTxPowerResourceConfigList-r10    BIT STRING
(SIZE (16)),
            zeroTxPowerSubframeConfig-r10        INTEGER
(0..154)
        }
    }
}
-- ASN1STOP
```

Now, a description of a Channel status information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI. Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

For reference, according to the current 3GPP standard document, the CQI index, the corresponding modulation order, and the coding rate are shown in Table 5 below.

TABLE 5

| CQI index | modulation | code rate × 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In one example, the operation for calculating the CQI using the interference measurement is as follows.

The user equipment needs to calculate the SINR as a factor necessary for calculating the CQI. In this case, the UE may perform the reception power measurement (S-measure) of the desired signal using the RS such as NZP CSI-RS. For an interference power measurement (I-measure or Interference measurement), the UE measures the power of an interfering signal resulting from removal of the desired signal from the received signal.

The subframe sets $C_{CSI,0}$ and $C_{CSI,1}$ for CSI measurement may be configured via a higher layer signaling. The subframes corresponding to each of the subframe sets may not overlap with each other, but may be included in only one set. In such a case, the UE may perform the S-measure using RS such as CSI-RS without special subframe restrictions. However, in the case of I-measure, the UE individually performs the I-measure for each of subframe sets $C_{CSI,0}$ and $C_{CSI,1}$. Thus, the UE has to perform two different CQI calculations for the subframe sets $C_{CSI,0}$ and $C_{CSI,1}$.

Recently, active research on the introduction of Active Antenna System (AAS) is under way in the next generation mobile communication. In the AAS, each antenna is composed of an active antenna including an active circuit. Thus, varying the antenna pattern depending on the situation may allow reducing interference or performing beamforming efficiently.

When such an AAS is constructed in two dimensions, that is, when 2D-AAS is implemented, it is possible to more aggressively change the transmission beam according to the position of the receiving end by adjusting the main lobe of the antenna three-dimensionally more efficiently in terms of antenna patterns.

Figure 8:
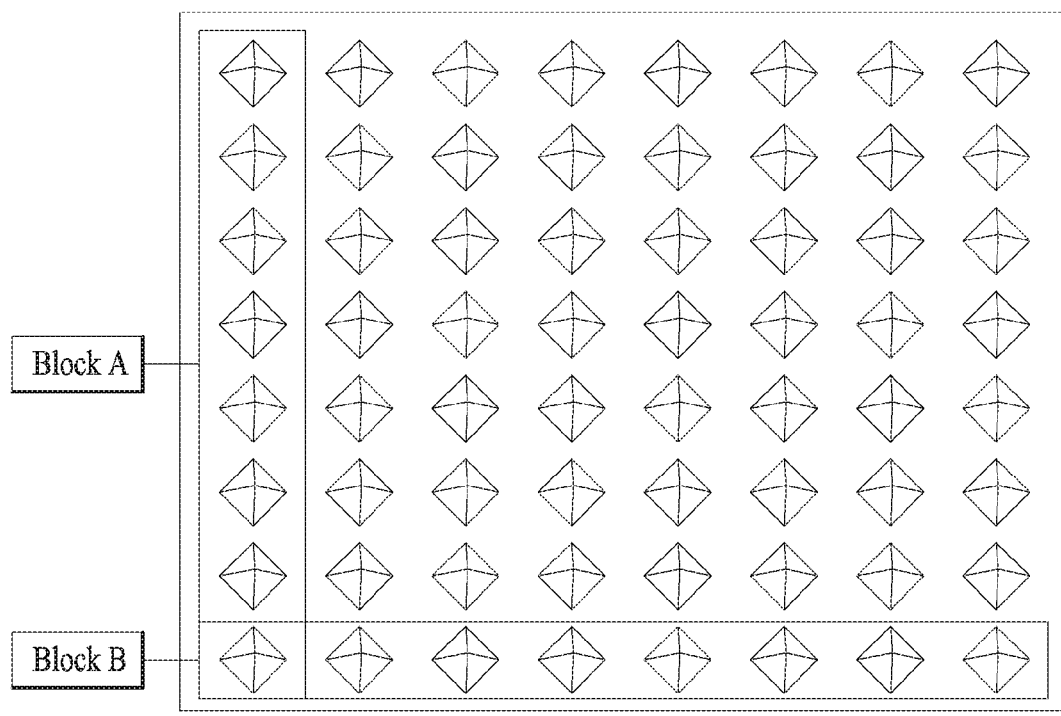
FIG. 8 shows an implementation of 2D-AAS.

FIG. 8 shows an implementation of 2D-AAS. Specifically, in FIG. 8, it is assumed that the antenna array is a co-polarized antenna array with each antenna element having the same polarization. Referring to FIG. 8, in the 2D-AAS, the antennas are arranged in the vertical and horizontal directions, and, thus, a system of multiple antennas can be constructed.

In a full dimension (FD)-MIMO system using the 2D-AAS, the base station may configure several CSI-RS resources in one CSI process for the UE. In this connection, the CSI process refers to an operation of feedbacking channel information using an independent feedback configuration.

In this case, the UE does not regard the CSI-RS resources configured in the single CSI process as an independent channel. Rather, the UE aggregates the resources and thus assumes a single large CSI-RS resource. Then, the UE computes and feeds back CSI from these resources. For example, the base station may configure three 4-port CSI-RS resources in a single CSI process for the UE. The UE aggregates these resources and thus assumes a single 12-port CSI-RS resource. The UE calculates and feeds back the CSI using the 12-port PMI from this CSI-RS resource. This reporting mode may be referred to as Class A CSI reporting in the LTE-A system.

Alternatively, the UE may assume that each CSI-RS resource is an independent channel. The UE selects one of the CSI-RS resources and calculates and reports the CSI based on the selected resource. That is, the UE selects a CSI-RS with the strongest channel among the eight CSI-RSs. Then, the UE calculates the CSI based on the selected CSI-RS and reports the calculated CSI to the base station. In this regard, the UE reports the selected CSI-RS to the base station via the CSI-RS Resource Indicator (CRI). For example, if the channel of the first CSI-RS corresponding to T (0) is strongest, the UE configures CRI=0 and reports the same to the base station. This reporting mode may be referred to as Class B CSI reporting in the LTE-A system.

To effectively demonstrate this feature, in the class B, the following variables may be defined for the CSI process. K is the number of CSI-RS resources in the CSI process. Nk denotes the number of CSI-RS ports of the k-th CSI-RS resource.

Recently, in 3GPP standardization, in addition to a periodic NZP (Nonzero Power) CSI-RS (Periodic CSI-RS; P CSI-RS) transmitted based on the period and offset as shown in Table 3, an aperiodic NZP CSI-RS (Aperiodic CSI-RS; AP CSI-RS) has been introduced. In particular, the AP CSI-RS differs from the P CSI-RS in that only one transmission thereof is performed at a specific point in time. Hereinafter, "NZP" is omitted. Unless "ZP" (zero power) is specified, the CSI-RS means the NZP CSI-RS.

More specifically, multiple CSI-RS resources may be configured in a single CSI process via RRC layer signaling as an upper layer signaling. In this connection, several CSI-RS resources may be composed of only P CSI-RS or alternatively may be composed only of AP CSI-RS. Alternatively, multiple CSI-RS resources may be configured as a combination of P CSI-RS and AP CSI-RS.

When a single AP CSI-RS is configured in a single CSI process, UE operation is clear as follows. When AP CSI reporting of the CSI process is triggered via the UL grant, the UE finds the AP CSI-RS in the subframe (SF) on which the UL grant is received and measures the channel of the AP CSI-RS, and calculates CSI based on the measurement. The UE then reports the CSI via the PUSCH after n subframes (where n=4 or 5) from the triggering time. Since there is no subframe configuration information in the configuration of AP CSI-RS configured via RRC signaling, the UE receives the AP CSI-RS on the corresponding subframe on which the triggering occurs.

First Embodiment

The first embodiment of the present disclosure proposes a base station operation and a UE operation when a plurality of AP CSI-RSs are configured in a single CSI process. In particular, following two cases may be distinguished from each other: a case when only a plurality of AP CSI-RSs are configured in the single CSI process; and a case when a single AP CSI-RS and at least a single CSI-RS are simultaneously configured in the single CSI process.

First, when a plurality of AP CSI-RSs are configured in a single CSI process, the base station operation and the UE operation are defined as one of 1) to 3) as follows.

1) The base station triggers AP CSI reporting of the corresponding CSI process via DCI (Downlink Control Information) or uplink grant. The UE performs channel estimation from each of a plurality of AP CSI-RSs configured in the CSI process, selects one AP CSI-RS that is the most preferred. Then, the UE reports an index of the selected AP CSI-RS (i.e., the CSI-RS resource indicator (CRI)) and the RI/PMI/CQI for the selected AP CSI-RS to the base station.

2) The base station triggers AP CSI reporting of the corresponding CSI process via the DCI or uplink grant. The UE performs channel estimation from each of a plurality of AP CSI-RSs configured in the corresponding CSI process and reports RI/PMI/CQI for each channel to the base station.

3) The base station triggers a corresponding CSI process and an AP CSI report for one of the plurality of AP CSI-RSs defined in the CSI process via DCI or uplink grant. The UE checks the corresponding CSI process and the single AP CSI-RS selected by the base station. The UE reports the RI/PMI/CQI for the AP CSI-RS to the base station. More specifically, the triggering information included in the uplink grant of the DCI may indicate a CSI process for AP CSI reporting and a single AP CSI-RS (defined within the CSI process). Further, combinations between the CSI process and the AP CSI-RS may be provided to the UE via RRC signaling in advance by the base station. Triggering of the AP CSI report may be defined by the base station such that one of the corresponding combinations is indicated via the DCI, i.e., the uplink grant.

For example, the base station may configure a plurality of CSI processes for the UE, via RRC signaling. Further, the base station may trigger aperiodic CSI via DCI or uplink grant. In this case, the base station may designate at least one of the plurality of CSI processes. In this case, according to the embodiment of the present disclosure, since a plurality of AP CSI-RS resources may be defined in the CSI process, the base station may operate as follows: when the base station designates the at least one CSI process, the base station designates one of the plurality of AP CSI-RS resources together with the at least one CSI process.

The base station does not transmit the AP CSI-RS for the remaining AP CSI-RS REs not triggered in the CSI process. Instead, the base station uses the remaining AP CSI-RS REs that is not triggered in the CSI process for PDSCH transmission or mutes them. When the non-triggered remaining AP CSI-RS RE is used for PDSCH transmission, a rate matching such that the data may be mapped to the corresponding RE may be applied to the UE receiving the corresponding data. When the remaining unapplied AP CSI-RS RE is muted, a rate matching may be applied to a UE receiving data on an RB that includes the muted RE, such that the data is not transmitted using the corresponding muted RE.

In one example, the UE expects the base station to configure a subset/superset relationship as established between a plurality of AP CSI-RSs configured in a single CSI process. That is, when AP CSI-RS #1, AP CSI-RS #2 and AP CSI-RS #3 exist in the single CSI process, the antenna port and RE of the AP CSI-RS #3 may be respectively composed of a subset of antenna ports and a subset of REs of the AP CSI-RS #2. Further, the antenna port and RE of AP CSI-RS #2 may be respectively composed of a subset of antenna ports and a subset of REs of the AP CSI-RS #1.

Next, in the first embodiment of the present disclosure, when at least one AP CSI-RS and at least one P CSI-RS are simultaneously configured in a single CSI process, the base station operation and the UE operation are defined as one of the following operations.

a) The base station triggers AP CSI reporting of the corresponding CSI process via the uplink grant. The UE performs channel estimation from each of a plurality of AP CSI-RSs and a P CSI-RSs configured in a corresponding CSI process. The UE selects one most preferred AP CSI-RS and selects one most preferred P CSI-RS. The distinction between the AP CSI-RS and the P CSI-RS may be grasped based on the presence or absence of the subframe configuration information. That is, the CSI-RS without the subframe configuration information is AP CSI-RS, while the CSI-RS with the subframe configuration information is P CSI-RS. Alternatively, it may be determined whether the CSI-RS is an AP CSI-RS or a P CSI-RS, via a separate explicit indicator. Then, the UE reports the index (i.e., CRI) of the selected AP CSI-RS and the RI/PMI/CQI for the selected AP CSI-RS to the base station. Further, the UE reports the index (i.e., CRI) of the selected P CSI-RS and the RI/PMI/CQI for the selected P CSI-RS to the base station.

b) The base station triggers AP CSI reporting of the corresponding CSI process via the uplink grant. The UE performs channel estimation from each of a plurality of AP CSI-RSs and a P CSI-RSs configured in the corresponding CSI process. The UE selects one most preferred CSI-RS. Then, the UE reports the index (i.e., CRI) of the selected CSI-RS and the RI/PMI/CQI for the selected CSI-RS to the BS. The selected CSI-RS may be an AP CSI-RS or a P CSI-RS.

c) The base station triggers AP CSI reporting of the corresponding CSI process via the uplink grant. The UE performs channel estimation from each of a plurality of AP CSI-RSs and a P CSI-RSs configured in the corresponding CSI process. The UE selects one most preferred P CSI-RS. Then, the UE reports the index (i.e., CRI) of the selected P CSI-RS and the RI/PMI/CQI for the selected P CSI-RS to the base station. The UE reports the RI/PMI/CQI for each of all of the AP CSI-RSs to the base station without selecting one most preferred AP CSI-RS.

d) The base station triggers the corresponding CSI process and the AP CSI report for one of the CSI-RSs defined in the CSI process, via the uplink grant. The UE checks the corresponding CSI process and the single CSI-RS selected by the base station. The UE reports the RI/PMI/CQI for the selected CSI-RS to the base station. For the remaining CSI-RS REs not triggered in the CSI process, the base station does not transmit the CSI-RS. Instead, the remaining CSI-RS REs not triggered in the CSI process are used for PDSCH transmission or are muted. When the non-triggered remaining AP CSI-RS RE is used for PDSCH transmission, a rate matching may be applied to the UE receiving the data such that the data may be mapped to the corresponding RE. When the remaining non-triggered AP CSI-RS RE is muted, a rate matching may be applied to a UE receiving data on an RB that includes the muted RE such that the data is not transmitted on the corresponding muted RE.

e) The base station triggers the AP CSI report for the corresponding CSI process via the uplink grant. Additionally, the base station signals, to the UE, which of the AP CSI-RS and the P CSI-RS in the CSI process for which the AP CSI report is to be triggered.

When triggering for AP CSI-RS is instructed, the UE selects one of the AP CSI-RSs defined in the corresponding CSI process. The UE reports the selected AP CSI-RS index (i.e., CRI) and the RI/PMI/CQI for the selected AP CSI-RS to the base station. Alternatively, the UE reports to the base station the RI/PMI/CQI for each of all of the AP CSI-RSs defined in the corresponding CSI process.

When triggering for P CSI-RS is instructed, the UE selects one of the P CSI-RSs defined in the corresponding CSI process. The UE reports the selected P CSI-RS index (i.e., CRI) and the RI/PMI/CQI for the selected P CSI-RS to the base station. For the AP CSI-RS RE not triggered in the CSI process, the base station does not transmit the CSI-RS. Instead, the AP CSI-RS RE not triggered in the CSI process is used for the PDSCH transmission or is mutated. When remaining non-triggered AP CSI-RS RE is used for PDSCH transmission, a rate matching may be applied to the UE receiving the data so that the data may be mapped to the corresponding RE. When the remaining non-triggered AP CSI-RS RE is muted, a rate matching may be applied to a UE receiving data on an RB that includes the muted RE, such that the data is not transmitted on the corresponding muted RE.

Second Embodiment

In one example, when multiple AP CSI-RSs may be configured within a single CSI process, or AP CSI-RS and P CSI-RS are configured together in a single CSI process, the base station operation and UE operation may become more complex. Therefore, in order to simplify this operation, restrictions may be imposed on the CSI process definition in the AP CSI-RS configuration as follows.

When the base station is configuring the AP CSI-RS, the UE expects the AP CSI-RSs to be defined in different single CSI processes or the UE expects that only a specific AP CSI-RS exists in the CSI process in which the specific AP CSI-RS exists. That is, the UE expects that a plurality of AP CSI-RSs will not be configured in a single CSI process. Alternatively, UE expects that AP CSI-RS and P CSI-RS are not defined together in a single CSI process. That is, the UE expects that the K (in this connection, K is the number of CSI-RS defined in the class B CSI process) of the CSI process in which the AP CSI-RS exists is always set to one.

However, the above scheme may greatly limit the degree of freedom of scheduling and operation of the base station. In order to allow the freedom, it may be allowed that the multiple AP CSI-RSs are configured within a single CSI process, while it may not be allowed that AP CSI-RS and P CSI-RS are configured simultaneously in a single CSI process. Alternatively, conversely, multiple AP CSI-RSs may be not allowed to be configured in a single CSI process, while AP CSI-RS and P CSI-RS may be allowed to be configured in a single CSI process at the same time.

Third Embodiment

According to the current 3GPP LTE standard, a plurality of CSI processes may be configured for a single serving cell. In this connection, when the AP CSI report is triggered by the base station, the UE considers following operations to reduce the CSI calculation amount.

The UE has the ability to calculate CSIs for up to Nx CSI processes. When the number of CSI processes for which CSI has not yet been reported is defined as Nu, the UE calculates the CSIs only for the max ($N_x-N_u$, 0) CSI processes among the CSI processes for which the AP CSI reporting is triggered. The UE does not calculate the CSI for the remaining CSI processes.

When the AP CSI-RS is introduced later, in the above conventional operation, the UE may preferentially perform the CSI calculation for the CSI process in which the AP CSI-RS is configured. For example, when $N_x=4$ and $N_u=3$, and when AP CSI reporting for CSI process #1 with AP CSI-RS configured therein and AP CSI reporting for CSI process #2 with P CSI-RS configured therein are triggered simultaneously, the UE calculates the CSI for the CSI process #1 and does not calculate the CSI for the CSI process #2.

In another example, when $N_x=4$, and $N_u=3$ and the P CSI-RS is configured in the three reported CSI processes, and when the AP CSI reporting for the CSI process #1 with the AP CSI-RS configured therein and the AP CSI reporting for the CSI process #2 with the AP CSI-RS configured therein are simultaneously triggered, the UE calculates the CSIs for the CSI processes #1 and #2. The UE does not compute the CSI for one of the three non-reported CSI processes (e.g., a CSI process with the highest index).

A case when the AP CSI reporting for multiple P CSI-RSs is triggered may be compared with a case when the AP CSI reporting for multiple AP CSI-RSs is triggered. The latter case requires higher UE computational complexity than the former case. This is because of the following reasons: in the former case, the UE may initiate the CSI calculation using the P CSI-RS present at the time point prior to the triggering, while in the latter case, the UE must measure the AP CSI-RS and start the CSI calculation at the triggering time.

In order to mitigate this high computational complexity, the UE may determine and supply the UE capability to the base station to indicate a maximum number of (e.g., m) of AP CSI-RSs for which the UE can deal with the triggering of the CSI reports at a certain time point. When the base station triggers CSI reports for the number of AP CSI-RSs larger than m at the certain time point, the UE calculates CSIs only for up to m AP CSI-RSs and updates CSIs. The UE does not perform the CSI updates for the number of AP CSI-RSs corresponding to a number by which the exceeding number exceeds the threshold value m (naturally, the UE may perform CSI reporting for all of the AP CSI-RSs).

When there are K AP CSI-RSs in a single CSI process and the UE reports a CSI for a single AP CSI-RS selected via CRI, the CSI report is made only for the selected single AP CSI-RS even when a plurality of AP CSI-RSs exist in the single CSI process. Thus, this may be defined as the UE receiving the triggering for the CSI report for one AP CSI-RS. In yet another aspect, even in this case, since the UE must measure all of the K AP CSI-RSs, this may be defined as the UE receiving triggering for CSI reporting on the K AP CSI-RSs with considering the processing capability of the UE.

When, in consideration of the limited CSI calculation capability by the UE, it is determined which of the AP CSI-RSs for the UE to update and which AP CSI-RSs for the UE not to update, the AP CSI-RS existing in the CSI process having the low index is preferentially updated. When the CSI process indices are the same, the AP CSI-RS with a lower AP CSI-RS index is preferentially updated.

Alternatively, the UE may have the ability to compute CSI for up to m AP CSI-RSs. Thus, the UE reports this capability to the base station as UE performance information. In this connection, the number of AP CSI-RSs for which CSIs has not yet been reported to the BS is defined as $N_u$. In order to reduce the computational complexity of the AP CSI for the AP CSI-RS, the UE calculates the CSI for only the max (m-$N_u$, 0) AP CSI-RSs among the AP CSI-RSs for which the AP CSI report has been triggered. The UE does not calculate and/or update the CSI for the remaining AP CSI-RSs.

Additionally, for relaxation of high computational complexity, CSI processing relaxation for the AP CSI-RS may be considered. In one example, when the AP CSI report for the AP CSI-RS has been triggered during the N sub-frames, the UE does not perform an update for AP CSIs exceeding K. N and K may be signaled by the base station to the UE, or the UE may report N and K as the UE capability to the base station. In a more specific example, when K is 1 and when the base station has triggered AP CSI for one AP CSI-RS at the time point n, and when the base station has triggered the AP CSIs for additional AP CSI-RSs until a later time point n+N−1, the UE does not perform the update on the AP CSIs for the additional AP CSI-RSs.

In one embodiment, the AP CSI-RS is transmitted once independently unlike the P CSI-RS. Thus, a current AP CSI-RS is independent of a previous AP CSI-RS before the triggering of the AP CSI report for the current AP CSI-RS. Therefore, it may be inappropriate for the UE not to perform the CSI update because there is no CSI reported prior to the triggering time.

Thus, when the AP CSI reporting for AP CSI-RS has been triggered during the N sub-frames, the UE may report any CSI among a number of AP CSIs corresponding to the number exceeding K. As a result, the UE does not calculate the CSI when the corresponding condition is satisfied, and rather, the UE selects and reports any CSI to the BS. Thus, the base station interprets this CSI as a meaningless CSI. Alternatively, the UE does not expect the base station to trigger more than K AP CSI reports for AP CSI-RSs during N sub-frames. N may be fixed to 5 with considering that the minimum period of the existing P CSI-RS is 5 ms.

In order to further mitigate the high computational complexity, the UE may determine and supply the UE capability to the base station to indicate a maximum number of (e.g., m) of AP CSI-RSs for which the UE can deal with the triggering of the CSI reports at a certain time point. Thus, the UE may expect that the base station may not trigger CSI reports for the number of AP CSI-RSs larger than m at the certain time point. The base station receives the m value via the UE performance report from the UE. Thereafter, the base station does not trigger the CSI reports for the number of AP CSI-RSs corresponding to a number by which the exceeding number exceeds the threshold value m to the corresponding UE at a certain time.

Figure 9:
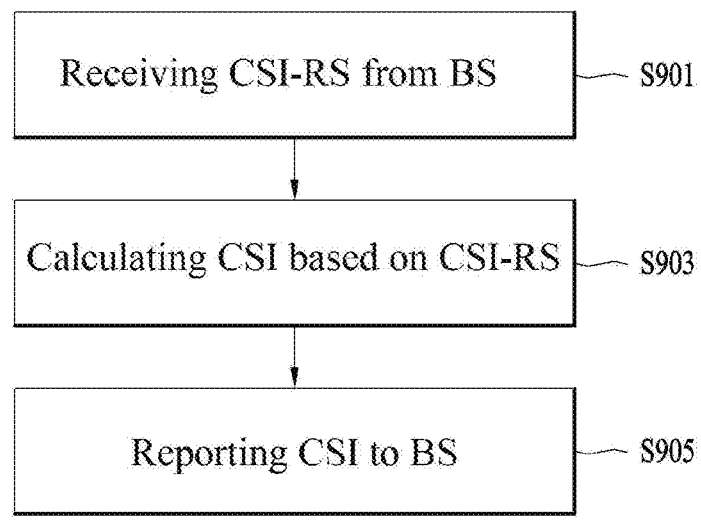
FIG. 9 is a flow chart illustrating a method for receiving aperiodic CSI-RS and reporting aperiodic CSI based on the CSI-RS in accordance with an embodiment of the present disclosure.

FIG. 9 is a flow chart illustrating a method for receiving an aperiodic CSI-RS and reporting an aperiodic CSI according to an embodiment of the present disclosure.

Referring to FIG. 9, at operation 901, the UE may report UE capability information to the base station in advance, for example, in establishing a connection with the base station. In this case, the UE capability information may include a threshold value for the CSI calculation capability.

Next, at operation 903, the UE may receive information regarding a plurality of CSI processes including a plurality of aperiodic CSI-RS resources via an upper layer, for example, an RRC layer. In other words, each CSI process may include a plurality of aperiodic CSI-RS resources. Further, each CSI process may also include one or more periodic CSI-RS resources.

Next, at operation 905, the UE receives a CSI report-triggering message from the base station via the DCI or uplink grant. The CSI report-triggering message includes information about a single CSI process among the plurality of CSI processes, and information on a single aperiodic reference signal among the plurality of aperiodic reference signal resources included in the single CSI process. That is, the single CSI process and the single aperiodic reference signal are joint-encoded and included in the CSI report-triggering message. The message may be provided to the UE via the DCI or uplink grant.

Finally, at operation 907, the UE updates and reports the aperiodic CSI for the at least one CSI process to the base station based on the single aperiodic reference signal.

However, when the number of CSI reports to be updated for a predetermined time unit exceeds the threshold value, only the number of CSI reports corresponding to a number below the threshold number may be updated. A value for the number of CSIs reports corresponding to a number by which the exceeding number exceeds the threshold value may be configured to any value. In this case, among the number of CSI reports corresponding to the number below the threshold, a CSI report corresponding to the lowest CSI process index is first selected.

Figure 10:
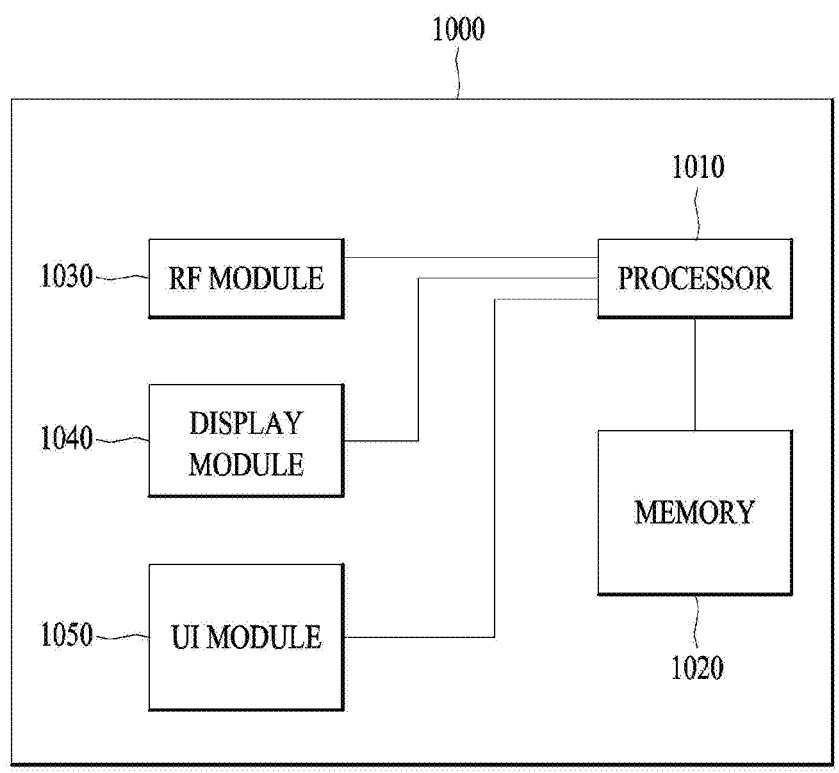
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present invention described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

An example in which the method and device for reporting aperiodic CSI based on aperiodic CSI-RS in the wireless communication system as described above are applied to a 3GPP LTE system has been mainly illustrated. The above method and device are applicable to various wireless communication systems other than the 3GPP LTE system.

The invention claimed is:

1. A method for transmitting, by a user equipment (UE), aperiodic channel status information (CSI) to a base station in a wireless communication system, the method comprising:
   transmitting, to the base station, UE capability information including a threshold value of CSI computing capability of the UE;
   receiving, from the base station, an aperiodic CSI report-triggering message via downlink control information (DCI),
   wherein the aperiodic CSI report-triggering message include information about at least one CSI process among a plurality of CSI processes, and about an aperiodic reference signal resource among a plurality of aperiodic reference signal resources included in the at least one CSI process; and
   transmitting the aperiodic CSI report to the base station by updating the aperiodic CSI report for the at least one CSI process based on the aperiodic reference signal resource,
   wherein, when a number of aperiodic CSI reports to be transmitted in a predetermined time unit is greater than the threshold value, a number of aperiodic CSI reports to be updated is equal to or less than the threshold value.

2. The method of claim 1, wherein the aperiodic CSI reports to be updated are selected in accordance from an aperiodic CSI report corresponding to a lowest CSI process index.

3. The method of claim 1, wherein the method further comprises receiving information about the plurality of CSI processes including the plurality of aperiodic reference signal resources via an upper layer from the base station.

4. The method of claim 1, wherein the DCI includes an uplink grant.

5. A user equipment (UE) in a wireless communication system, the UE comprising:
   a wireless communication module; and
   a processor coupled to the module, wherein the processor is configured to:
   transmit, to a base station, UE capability information including a threshold value of CSI computing capability of the UE,
   receive, from the base station, an aperiodic CSI report-triggering message via downlink control information (DCI),
   wherein the aperiodic CSI report-triggering message include information about at least one CSI process among a plurality of CSI processes, and about an aperiodic reference signal resource among a plurality of aperiodic reference signal resources included in the at least one CSI process; and
   transmit an aperiodic CSI report to the base station by updating the aperiodic CSI for the at least one CSI process based on the aperiodic reference signal resource,
   wherein, when a number of aperiodic CSI reports to be transmitted in a predetermined time unit is greater than the threshold value, a number of aperiodic CSI reports to be updated is equal to or less than the threshold value.

6. The UE of claim 5, wherein the aperiodic CSI reports to be updated are selected in accordance from an aperiodic CSI report corresponding to a lowest CSI process index.

7. The UE of claim 5, wherein the processor is configured for receiving information about the plurality of CSI processes including the plurality of aperiodic reference signal resources via an upper layer from the base station.

8. The UE of claim 5, wherein the DCI includes an uplink grant.

* * * * *